US010120885B2

(12) United States Patent
Mielenhausen (10) Patent No.: US 10,120,885 B2
(45) Date of Patent: Nov. 6, 2018

(54) SMART RESTRICT MODE FOR DATA DEFINITION STATEMENTS

(71) Applicant: SAP SE, Walldorf (DE)

(72) Inventor: Bjoern Mielenhausen, Plankstadt (DE)

(73) Assignee: SAP SE, Walldorf (DE)

(*) Notice: Subject to any disclaimer, the term of this patent is extended or adjusted under 35 U.S.C. 154(b) by 604 days.

(21) Appl. No.: 14/727,259

(22) Filed: Jun. 1, 2015

(65) Prior Publication Data
US 2016/0350348 A1    Dec. 1, 2016

(51) Int. Cl.
*G06F 17/30*      (2006.01)

(52) U.S. Cl.
CPC .. *G06F 17/30292* (2013.01); *G06F 17/30348* (2013.01); *G06F 17/30371* (2013.01)

(58) Field of Classification Search
CPC ......... G06F 17/30575; G06F 17/30563; G06F 17/30595; G06F 17/30607; G06F 17/30294; G06F 17/30377; G06F 17/30292; G06F 17/30348; G06F 17/30371
USPC ..... 707/999.102, 999.1, 803, 602, 802, 634, 707/703, 755; 717/151
See application file for complete search history.

(56) References Cited

U.S. PATENT DOCUMENTS

| | | | |
|---|---|---|---|
| 7,640,533 B1* | 12/2009 | Lottero | G06F 8/71 717/108 |
| 2005/0050068 A1* | 3/2005 | Vaschillo | G06F 17/30569 |
| 2006/0095447 A1* | 5/2006 | Dickinson | G06F 17/246 |
| 2010/0114962 A1* | 5/2010 | Ahadian | G06F 8/75 707/782 |
| 2011/0078113 A1* | 3/2011 | Franz | G06F 17/30297 707/634 |
| 2012/0278282 A1* | 11/2012 | Lu | G06F 17/30578 707/634 |

\* cited by examiner

*Primary Examiner* — Robert W Beausoliel, Jr.
*Assistant Examiner* — Pedro J Santos
(74) *Attorney, Agent, or Firm* — Schwegman Lundberg & Woessner, P.A.

(57) ABSTRACT

Example embodiments involve a system, computer-readable storage medium storing at least one program, and computer-implemented method for modifying a database object with one or more dependent database objects. The method may include receiving a data definition statement involving a modification to a database object. The received data definition statement includes a clause imposing a restriction on the modification to the database object. The method further includes determining whether the modification results in invalidation of at least one dependent database object in response to the clause being included in the received data definition statement. Based on determining that the modification results in the invalidation of at least one dependent database object, the modification to the database object is prevented. Based on determining that the modification does not result in the invalidation any dependent database objects, the modification to the database object is performed in accordance with the data definition statement.

20 Claims, 4 Drawing Sheets

SMART RESTRICT MODE FOR DATA DEFINITION STATEMENTS

TECHNICAL FIELD

Example embodiments of the present application generally relate to data processing and, more particularly, to database management techniques.

BACKGROUND

Database query languages are computer-readable languages used in querying, updating, and managing relational databases. In database query languages such as standard query language (SQL), objects may depend on tables and other objects stored in the database. For example, an SQL view object may depend on a data table. A traditional database management system (DBMS) supports automatic recompiling whenever objects in the SQL catalog are subject to change (e.g., via alter- or drop-statement) through one of two conventional approaches.

In the first approach, the DBMS provides a "restrict mode" in which any change is rejected if there are other objects depending on the object to be changed. As an example of the foregoing approach, consider the following code snippet:
  CREATE TABLE t(x INT, y INT);
  CREATE VIEW v AS SELECT y FROM t WHERE y=3;
  DROP TABLE t RESTRICT;
In the above example, the DROP statement will fail because VIEW v depends on TABLE t. In this approach, all depending objects must be deleted or changed to remove the dependency. The "RESTRICT" clause automatically drops any dependent object transitively. Because the "restrict mode" offers little flexibility, many DBMSs follow a second approach that supports more graceful data definition statements.

In the second approach, a DBMS provides a "smart mode" that allows changes to objects even if there are dependent objects, and even if the changes result in the invalidation of a dependent object. As an example, consider the following code snippet:
  CREATE TABLE t(x INT, y INT);
  CREATE VIEW v AS SELECT y FROM t WHERE y=3;
  DROP TABLE t;
In the above example, the DROP statement will succeed (i.e., the TABLE t will be dropped), but as a result of dropping t, the VIEW v will become invalid (e.g., VIEW v cannot be recompiled and any usage of VIEW v will result in an error). Thus, the approaches employed under conventional practice either prevent invalidation of dependent objects by preventing all modifications to objects with dependent objects, or allow all modifications to objects, regardless of whether such modification results in the invalidation of a dependent object.

However, situations may arise in which a programmer may want to change objects with dependent objects only when the change does not lead to invalidation of the dependent objects. For example, consider the following code snippet:
  CREATE TABLE t(x INT, y INT);
  CREATE VIEW v AS SELECT y FROM t WHERE y=3;
  ALTER TABLE t DROP COLUMN x;
In the above example, the VIEW v can be successfully reconciled since column x is not used within the definition of v.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Aspects of the present disclosure seek to improve functionality of the conventional DBMS by providing the ability to prevent modifications to database objects in instances in which a dependent object (e.g., an object that depends on another) is invalidated. In particular, example embodiments involve use of a "no-invalidation" clause in data definition statements. Use of a no-invalidation clause causes the statement to succeed only if all dependent objects can be successfully recompiled. In other words, use of a no-invalidation clause in conjunction with a data definition statement restricts the statement from being executed if the execution causes any dependent database object to become invalid (e.g., unable to be recompiled), but the statement is executed if no dependent object invalidation occurs.

For purposes of the present disclosure, the terms "data definition statement," and "statement" may be used synonymously to refer to an executable command within a database query language that expresses an action to be carried out with respect to a database object (e.g., a data object residing on a database). As an example, SQL includes a data definition language (DDL) that includes CREATE, ALTER, DROP, and REPLACE statements, each of which are examples of data definition statements. Although specific reference may be made in the present disclosure to data definition statements that are provided as part of a particular programming language, namely SQL, it shall be appreciated that the subject matter of the present disclosure is not intended to be limited to SQL and may be equally applicable to other programming languages.

Figure 1:
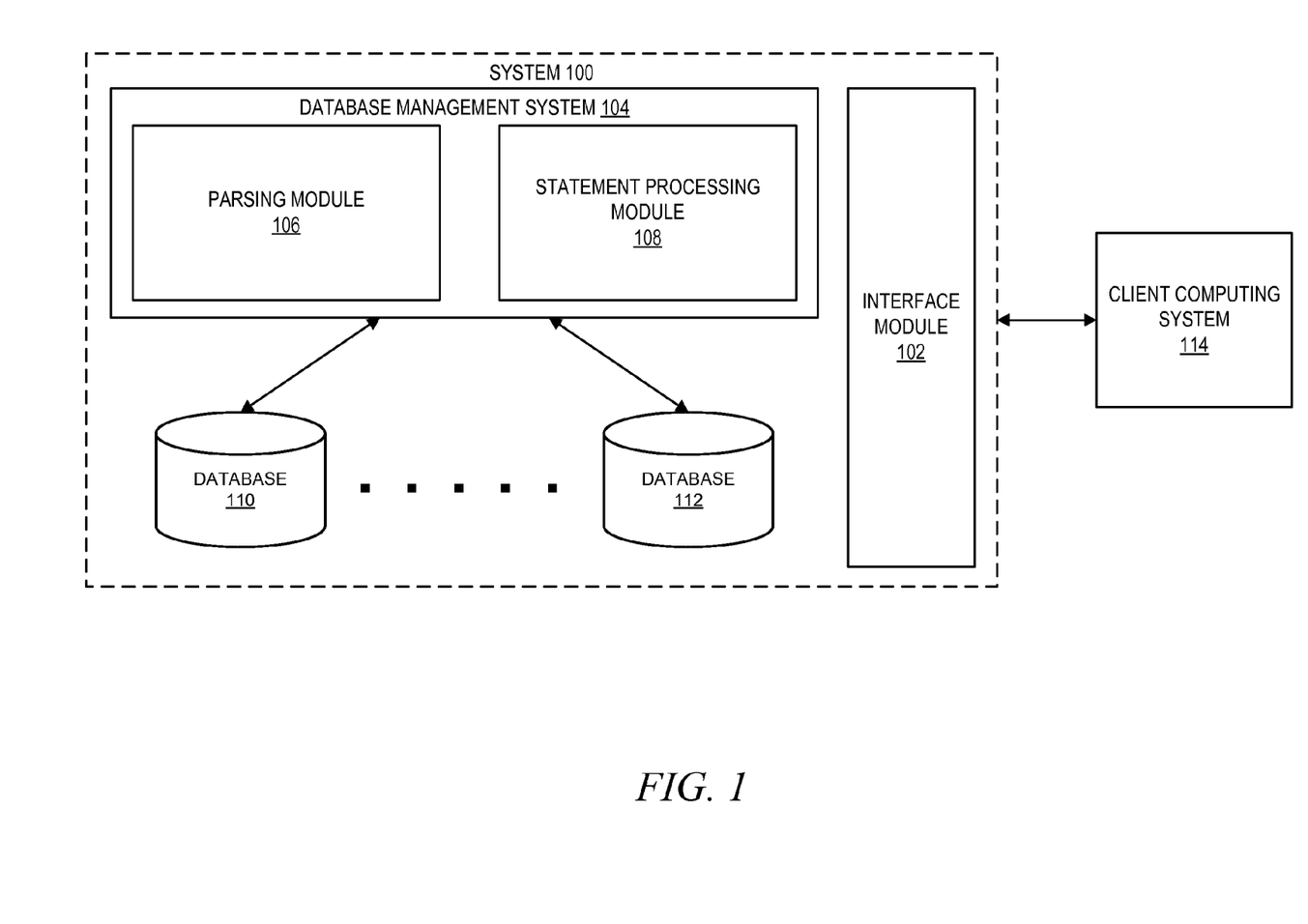
FIG. 1 is a block diagram illustrating a system according to an example embodiment.

FIG. 1 is a block diagram illustrating a system 100 according to an example embodiment. As is understood by skilled artisans in the relevant computer and Internet-related arts, each component illustrated in FIG. 1 represents a set of executable software instructions and the corresponding hardware (e.g., memory and processor) for executing the instructions. To avoid obscuring the inventive subject matter with unnecessary detail, various functional components (e.g., modules) that are not germane to conveying an understanding of the inventive subject matter have been omitted from FIG. 1. However, a skilled artisan will readily recognize that various additional functional components may be supported by the system 100 to facilitate additional functionality that is not specifically described herein. Moreover, it shall be appreciated that although the various functional components of the system 100 are discussed in the singular sense, multiple instances of one or more of the various functional components may be employed.

As shown, the system 100 includes an interface module 102 and a DBMS 104 comprising a parsing module 106 and a statement processing module 108, configured to communicate with each other (e.g., via a bus, shared memory, a switch, or application programming interfaces (APIs)). The various functional components of system 100 may reside on a single computer (e.g., a server), or may be distributed across several computers in various arrangements.

The interface module 102 provides interfaces such as a Graphical User Interface (GUI) or Application Programming Interface (API) that may be used to receive user commands and data. The DBMS 104 generally is a software subsystem for storing, retrieving, and manipulating information (e.g., database objects) stored in database tables of databases 110-112. Under the command of DBMS 104, the system 100 receives user commands (e.g., data definition statements) and data submitted by a client computing system 114 through the interface module 102. User interfaces provided by the interface module 102 may include a built-in query surface or editor for accessing and processing database information.

The parsing module 106 is responsible for parsing and analyzing commands received by the interface module 102. In particular, the parsing module 106 may analyze data definition statements to break them into their component parts to facilitate processing by the statement processing module 108. The statement processing module 108 is responsible for processing data definition statements, which includes executing the actions expressed in the data definition statements.

Figure 2:
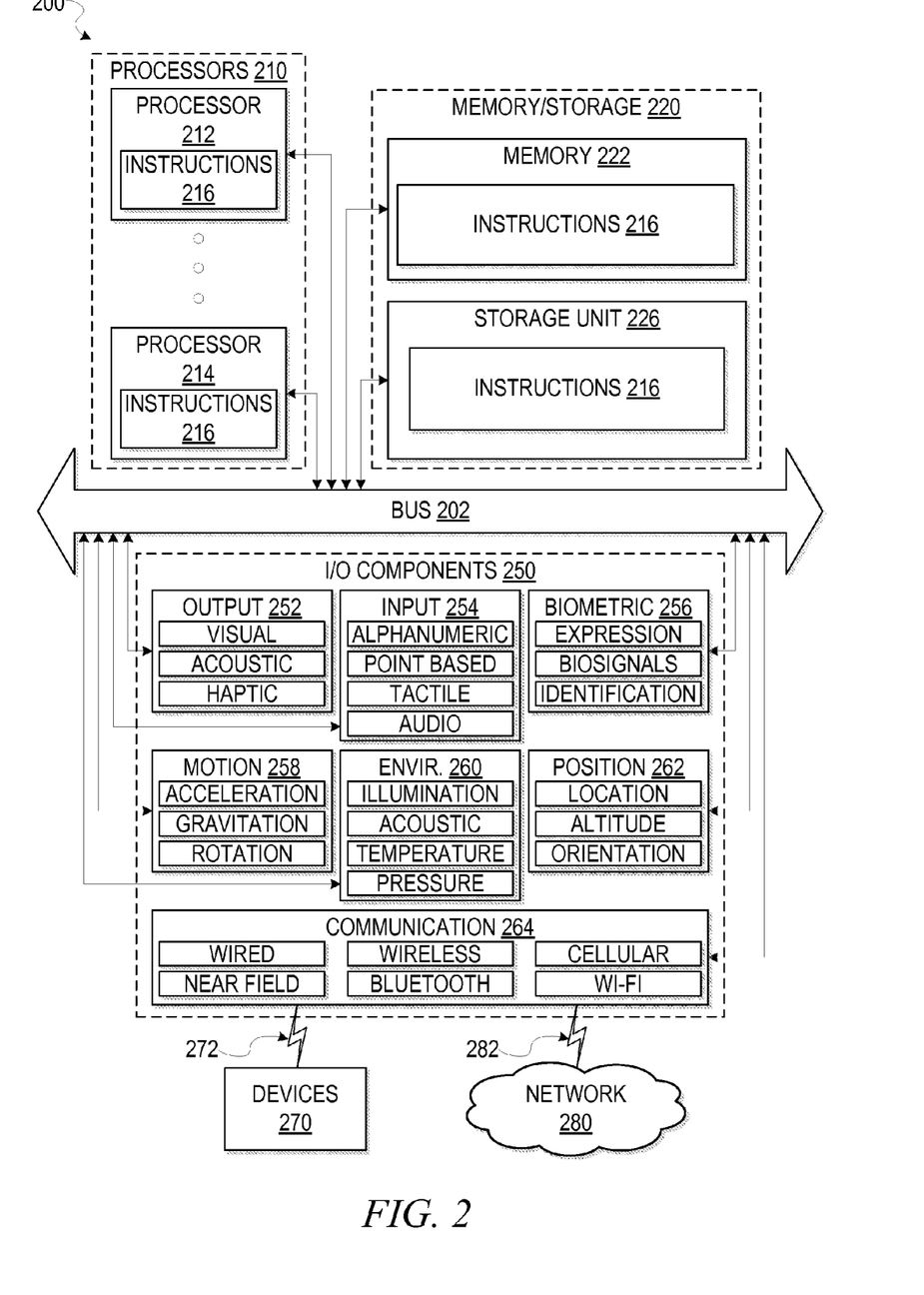
FIG. 2 is a is a diagrammatic representation of a machine in the example form of a computer system within which a set of instructions for causing the machine to perform any one or more of the methodologies discussed herein may be executed.

FIG. 2 is a block diagram illustrating components of a machine 200, according to some example embodiments, able to read instructions from a machine-readable medium (e.g., a machine-readable storage medium) and perform any one or more of the methodologies discussed herein. Specifically, FIG. 2 shows a diagrammatic representation of the machine 200 in the example form of a computer system, within which instructions 216 (e.g., software, a program, an application, an applet, an app, or other executable code) for causing the machine 200 to perform any one or more of the methodologies discussed herein may be executed. For example, these instructions 216 transform the general, non-programmed machine into a particular machine programmed to carry out the described and illustrated functions of the system 100 in the manner described herein. The machine 200 may operate as a standalone device or may be coupled (e.g., networked) to other machines. In a networked deployment, the machine 200 may operate in the capacity of a server machine or a client machine in a server-client network environment, or as a peer machine in a peer-to-peer (or distributed) network environment. By way of non-limiting example, the machine 200 may comprise or correspond to a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 216, sequentially or otherwise, that specify actions to be taken by the machine 200. Further, while only a single machine 200 is illustrated, the term "machine" shall also be taken to include a collection of machines 200 that individually or jointly execute the instructions 216 to perform any one or more of the methodologies discussed herein.

The machine 200 may include processors 210, memory 220, and input/output (I/O) components 250, which may be configured to communicate with each other such as via a bus 202. In an example embodiment, the processors 210 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 212 and processor 214 that may execute instructions 216. The term "processor" is intended to include multi-core processor that may comprise two or more independent processors (sometimes referred to as "cores") that may execute instructions contemporaneously. Although FIG. 2 shows multiple processors, the machine 200 may include a single processor with a single core, a single processor with multiple cores (e.g., a multi-core process), multiple processors with a single core, multiple processors with multiples cores, or any combination thereof.

The memory/storage 220 may include a memory 222, such as a main memory, or other memory storage, and a storage unit 226, both accessible to the processors 210 such as via the bus 202. The storage unit 226 and memory 222 store the instructions 216 embodying any one or more of the methodologies or functions described herein. The instructions 216 may also reside, completely or partially, within the memory 222, within the storage unit 226, within at least one of the processors 210 (e.g., within the processor's cache memory), or any suitable combination thereof, during execution thereof by the machine 200. Accordingly, the memory 222, the storage unit 226, and the memory of processors 210 are examples of machine-readable media.

As used herein, "machine-readable medium" means a device able to store instructions (e.g., instructions 216) and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 216. The term "machine-readable medium" shall also be taken to include any medium, or combination of multiple media, that is capable of storing instructions (e.g., instructions 216) for execution by a machine (e.g., machine 200), such that the instructions, when executed by one or more processors of the machine 200 (e.g., processors 210), cause the machine 200 to perform any one or more of the methodologies described herein. Accordingly, a "machine-readable medium" refers to a single storage apparatus or device, as well as "cloud-based"

storage systems or storage networks that include multiple storage apparatus or devices. The term "machine-readable medium" excludes signals per se.

The I/O components 250 may include a wide variety of components to receive input, provide output, produce output, transmit information, exchange information, capture measurements, and so on. The specific I/O components 250 that are included in a particular machine will depend on the type of machine. For example, portable machines such as mobile phones will likely include a touch input device or other such input mechanisms, while a headless server machine will likely not include such a touch input device. It will be appreciated that the I/O components 250 may include many other components that are not shown in FIG. 2. The I/O components 250 are grouped according to functionality merely for simplifying the following discussion and the grouping is in no way limiting. In various example embodiments, the I/O components 250 may include output components 252 and input components 254. The output components 252 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 254 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 250 may include biometric components 256, motion components 258, environmental components 260, or position components 262 among a wide array of other components. For example, the biometric components 256 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 258 may include acceleration sensor components (e.g., accelerometer), gravitation sensor components, rotation sensor components (e.g., gyroscope), and so forth. The environmental components 260 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 262 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 250 may include communication components 264 operable to couple the machine 200 to a network 280 or devices 270 via coupling 282 and coupling 272, respectively. For example, the communication components 264 may include a network interface component or other suitable device to interface with the network 280. In further examples, communication components 264 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 270 may be another machine or any of a wide variety of peripheral devices (e.g., a peripheral device coupled via a Universal Serial Bus (USB)).

Moreover, the communication components 264 may detect identifiers or include components operable to detect identifiers. For example, the communication components 264 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 264, such as location via Internet Protocol (IP) geo-location, location via Wi-Fi® signal triangulation, location via detecting a NFC beacon signal that may indicate a particular location, and so forth.

In various example embodiments, one or more portions of the network 280 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 280 or a portion of the network 280 may include a wireless or cellular network and the coupling 282 may be a Code Division Multiple Access (CDMA) connection, a Global System for Mobile communications (GSM) connection, or other type of cellular or wireless coupling. In this example, the coupling 282 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (2GPP) including 2G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 216 may be transmitted or received over the network 280 using a transmission medium via a network interface device (e.g., a network interface component included in the communication components 264) and utilizing any one of a number of well-known transfer protocols (e.g., Hypertext Transfer Protocol (HTTP)). Similarly, the instructions 216 may be transmitted or received using a transmission medium via the coupling 272 (e.g., a peer-to-peer coupling) to devices 270. The term "transmission medium" shall be taken to include any intangible medium that is capable of storing, encoding, or carrying instructions 216 for execution by the machine 200, and includes digital or analog communications signals or other intangible medium to facilitate communication of such software.

Figure 3:
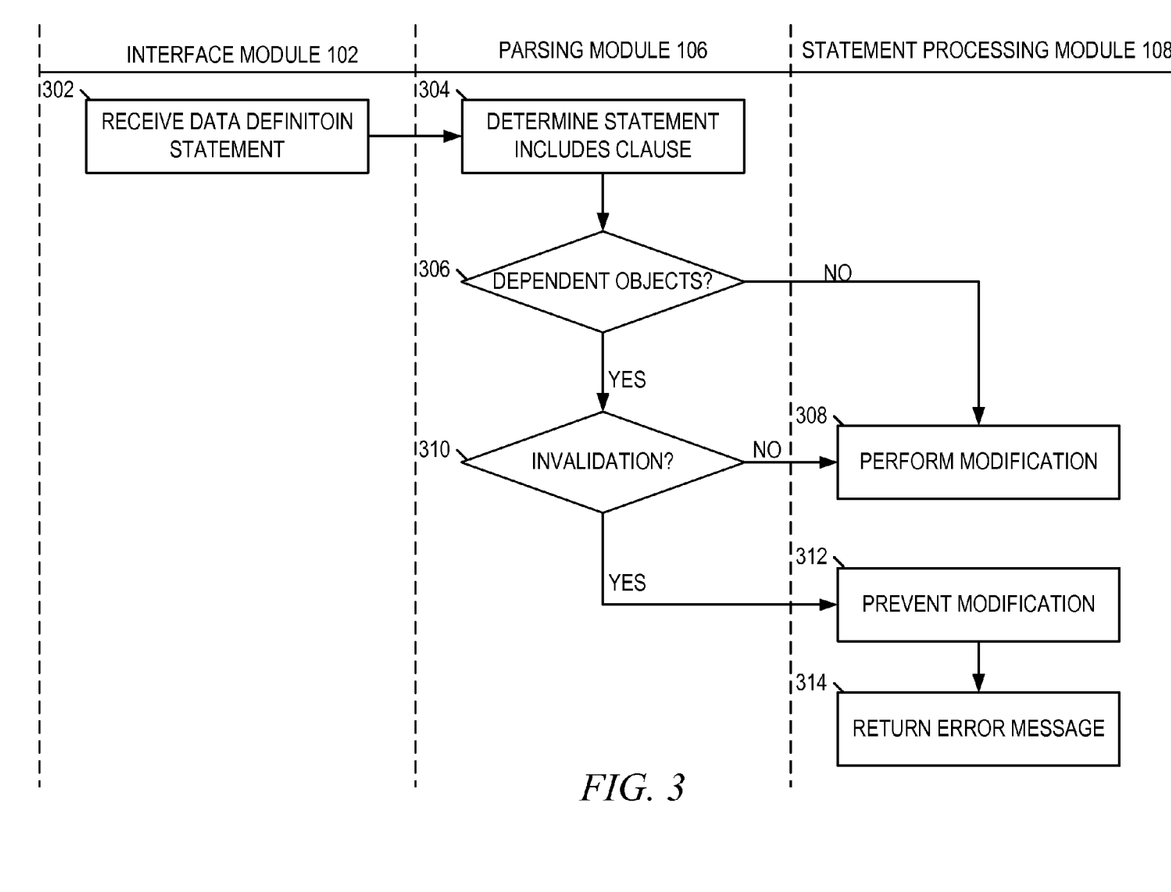
FIG. 3 is an interaction diagram that illustrates interactions between the various functional components of the system, according to an example embodiment.

FIG. 3 is an interaction diagram illustrating interactions between the various functional components of the system 100, according to an example embodiment. In particular, FIG. 3 illustrates example interactions that occur between the interface module 102, the parsing module 106, and the statement processing module 108 upon receiving a data definition statement (e.g., from the client computing system 114) signaling modification of a database object.

As shown, the process begins at operation 302 with the interface module 102 receiving a data definition statement to command modification (e.g., an ALTER or DROP statement in SQL) of a database object (e.g., a data table). The modification may, for example, involve a change to an element of a database object, addition of a new element, or deletion of an existing element. As an example, the data definition statement may include a command to remove a column from an existing data table. As another example, the data definition statement may include a command to change a column in an existing data table.

At operation 304, the parsing module 106 parses the data definition statement to determine that a no-invalidation clause is included in the statement. The inclusion of a no-invalidation clause in the data definition statement imposes a restriction on the modification to the database object. Specifically, the no-invalidation clause is used to command the DBMS 104 to prevent the modification if the modification causes a dependent database object to become invalid (e.g., any use of the dependent database object would result in an error). In other words, because the data definition state includes the no-invalidation clause, the DBMS 104 will perform the modification only if no dependent database object invalidation occurs.

Based on the no-invalidation clause being included in the statement, the parsing module 106 determines, at operation 306, whether there are any other database objects that depend from the database object that is the subject of the data definition statement. For example, the database object may be a data table, and the parsing module 106 may identify a view object that depends on at least a portion of the data table. If the parsing module 106 determines that there are no dependent database objects (e.g., other database objects that depend on the database object), then the statement processing module 108 performs the modification in accordance with the data definition statement, at operation 308.

If the parsing module 106 determines that the database object has at least one dependent database object, the parsing module 106 proceeds to operation 310, where the parsing module 106 evaluates the data definition statement to determine whether the modification would result in the invalidation of any of the dependent objects (e.g., whether any of the dependent object cannot be recompiled as a result of the modification). In some embodiments, the determination of whether the database object has any dependent database objects (operation 306) may be performed as part of the determination of whether the modification would result in the invalidation of any of the dependent objects (operation 308).

If the parsing module 106 determines through operation 310 that no invalidation of a dependent database object would occur as a result of the modification, the statement processing module 108 performs the modification at operation 308. If, on the other hand, the parsing module 106 determines that at least one dependent object would be invalidated as a result of the modification (e.g., deleting a column of a data table from which a view object depends), the statement processing statement 108 prevents the modification to the database object (e.g., the statement processing module 108 causes the data definition statement to fail), at operation 312. At operation 314, the statement processing module 108 returns an error message in response to the data definition statement based on the data definition statement including a no-invalidation clause, and causing the invalidation of a dependent database object.

Figure 4:
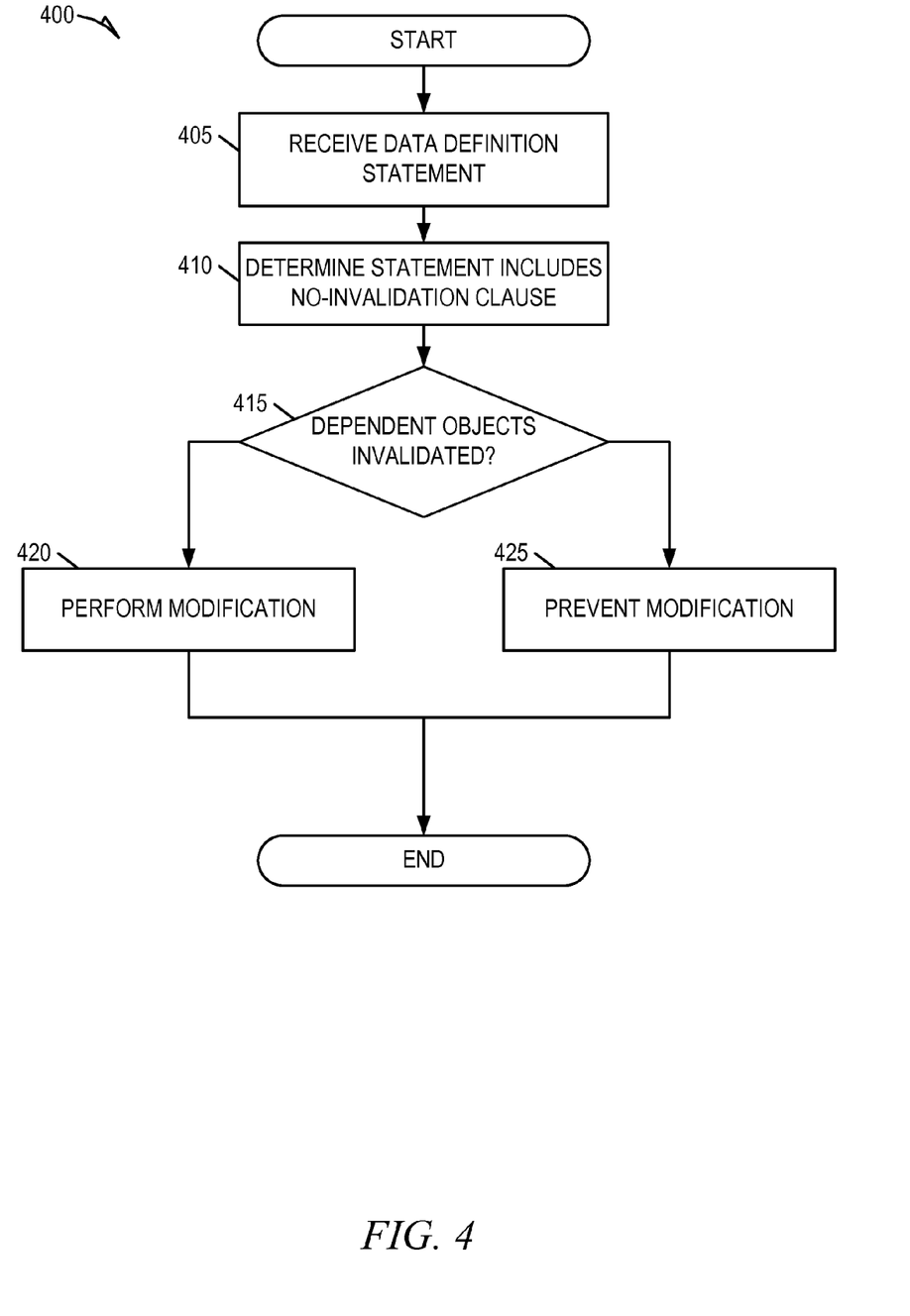
FIG. 4 is a flow chart illustrating a method for changing a database object having one or more dependent database objects, according to an example embodiment.

FIG. 4 is a flow chart illustrating a method 400 for creating a database object with dependencies on a non-existing database object, according to an example embodiment. The method 400 may be embodied in computer-readable instructions for execution by one or more processors such that the steps of the method 400 may be performed in part or in whole by the components of the DBMS 102; accordingly, the method 400 is described below by way of example with reference thereto. However, it shall be appreciated that the method 400 may be deployed on various other hardware configurations and is not intended to be limited to the DBMS 104.

At operation 405, the interface module 102 receives a data definition statement (e.g., from the client computing system 114) and signals modification of a database object having at least one dependent database object. For example, the interface module 102 may receive a SQL ALTER statement signaling modification of a portion of a data table from which a view object depends. The data definition statement also includes a no-invalidation clause that imposes a restriction on the modification to the database object (e.g., by preventing the modification if the modification causes a dependent database object to become invalid).

At operation 410, the parsing module 106 parses the data definition statement to determine whether the data definition statement includes the no-invalidation clause. Based on the no-invalidation clause being included in the data definition statement, the parsing module 106, at operation 415, evaluates the data definition statement to determine whether the modification results in the invalidation of any of the dependent database objects (e.g., objects that depend on the database object that is the subject of the data definition statement). The determination of whether the modification results in the invalidation of any dependent database object may include identifying dependent database objects with dependence on the database object, and determining whether the dependent database objects are able to be successfully recompiled as a result of the modification.

If the parsing module 106 determines that the modification results in the invalidation of any dependent database objects, the data definition statement fails and the statement processing module 108 prevents the modification from occurring at operation 425. In some embodiments, the statement processing module 108 may further return an error message in response to the failure of the data definition statement. If the parsing module 106 determines that the modification does not result in the invalidation of any dependent database objects, the data definition statement succeeds and the statement processing module 108 performs the modification to the database object, at operation 420, in accordance with the data definition statement.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice.

Language

Although the present inventive subject matter has been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A system comprising:
   an interface, implemented by one or more hardware processors, configured to receive a data definition statement involving a modification to a database object stored in a database, the data definition statement including a clause imposing a restriction on the modification to the database object based on whether the modification results in invalidation of at least one dependent database object of the database object;
   a parser, implemented by the one or more hardware processors, configured to determine whether the modification results in invalidation of at least one dependent database object of the database object in response to the clause being included in the data definition statement, the parser being configured to determine whether the modification results in the invalidation of the at least one dependent database object by performing operations including determining whether the at least one dependent database object is able to be successfully recompiled as a result of the modification; and
   a statement processor implemented by the one or more hardware processors, configured to prevent the modification to the database object based on determining that the modification results in the invalidation of the at least one dependent database object; the statement processor further to perform the modification to the database object based on determining that the modification does not result in the invalidation of the at least one dependent database object.

2. The system of claim 1, wherein the parser is further to determine whether the database object has one or more dependent database objects.

3. The system of claim 2, wherein the parser is to determine that the modification does not result in the invalidation of at least one dependent database object by determining that the database object does not have a dependent database object.

4. The system of claim 1, wherein the parser is further configured to identify one or more dependent database objects with dependence on the database object.

5. The system of claim 1, wherein the statement processor is further to issue an error message in response to determining that the modification results in invalidation of at least one dependent database object.

6. The system of claim 1, wherein the data definition statement is a data definition language (DDL) statement in standard query language (SQL).

7. The system of claim 1, wherein the modification to the database object includes a deletion of an element of the database object.

8. The system of claim 1, wherein the data definition statement includes a command to change an element of the database object.

9. The system of claim 1, wherein the database object is a data table, and wherein the at least one dependent database object includes a view object corresponding to a portion of the data table.

10. A method comprising:
    receiving a data definition statement involving a modification to a database object, the data definition statement including a clause imposing a restriction on the modification to the database object based on whether the modification results in invalidation of at least one dependent database object of the database object;
    in response to the clause being included in the received data definition statement, determining, using one or more processors of a machine, whether the modification results in invalidation of at least one dependent database object, the at least one dependent database object being dependent on the database object, the determining of whether the modification results in the invalidation of the at least one dependent database object includes determining whether the at least one dependent database object is able to be successfully recompiled as a result of the modification;

based on determining that the modification results in the invalidation of at least one dependent database object, preventing the modification to the database object.

11. The method of claim 10, further comprising performing the modification to the database object in accordance with the data definition statement based on determining that the modification does not result in the invalidation of at least one dependent database object.

12. The method of claim 10, wherein determining whether the modification results in the invalidation of at least one dependent database object includes determining whether the database object has one or more dependent database objects.

13. The method of claim 12, further comprising:
wherein determining that the modification does not result in the invalidation of at least one dependent database object includes determining that the database object does not have one or more dependent database objects.

14. The method of claim 10, wherein the determining whether the modification results in the invalidation of at least one dependent database object further includes:
identifying one or more dependent database objects with dependence on the database object.

15. The method of claim 10, further comprising issuing an error message in response to determining that the modification results in the invalidation of at least one dependent database object.

16. The method of claim 10, wherein the data definition statement is a data definition language (DDL) statement in standard query language (SQL).

17. The method of claim 10, wherein the modification to the database object includes a change to an element of the database object.

18. The method of claim 10, wherein the data definition statement includes a command to delete at least a portion of the database object.

19. The method of claim 10, wherein the database object is a data table, and wherein the at least one dependent database object includes a view object corresponding to a portion of the data table.

20. A tangible computer-readable storage medium including instructions that, when executed by at least one processor of a machine, cause the machine to perform operations comprising:
receiving a data definition statement involving a modification to a database object, the data definition statement including a clause imposing a restriction on the modification to the database object based on whether the modification results in invalidation of at least one dependent database object of the database object;
in response to the clause being included in the received data definition statement, determining; using one or more processors of a machine, whether the modification results in invalidation of at least one dependent database object, the at least one dependent database object being dependent on the database object, the determining of whether the modification results in the invalidation of the at least one dependent database object includes determining whether the at least one dependent database object is able to be successfully recompiled as a result of the modification;
based on determining that the modification results in the invalidation of at least one dependent database object, preventing the modification to the database object; and
based on determining that the modification does not result in the invalidation of at least one dependent database object, performing the modification to the database object in accordance with the data definition statement.

* * * * *